(12) United States Patent
Hammond et al.

(10) Patent No.: US 11,032,716 B2
(45) Date of Patent: Jun. 8, 2021

(54) SECURE COMMUNICATION FOR MACHINE TO MACHINE CONNECTIONS

(71) Applicant: BlackBerry Limited, Waterloo (CA)

(72) Inventors: Niko Ashley Hammond, Calgary (CA); Adam John Boulton, Wirral (GB)

(73) Assignee: BlackBerry Limited, Waterloo (CA)

( * ) Notice: Subject to any disclaimer, the term of this patent is extended or adjusted under 35 U.S.C. 154(b) by 103 days.

(21) Appl. No.: 16/206,110

(22) Filed: Nov. 30, 2018

(65) Prior Publication Data
US 2020/0178072 A1    Jun. 4, 2020

(51) Int. Cl.
| H04W 12/60 | (2021.01) |
|---|---|
| H04L 29/06 | (2006.01) |
| G06F 21/55 | (2013.01) |
| H04W 12/48 | (2021.01) |
| H04W 4/40 | (2018.01) |
| H04W 4/70 | (2018.01) |
| G06F 8/65 | (2018.01) |

(52) U.S. Cl.
CPC ............ *H04W 12/66* (2021.01); *G06F 21/55* (2013.01); *H04L 63/145* (2013.01); *H04L 63/1433* (2013.01); *H04W 12/48* (2021.01); *G06F 8/65* (2013.01); *H04W 4/40* (2018.02); *H04W 4/70* (2018.02)

(58) Field of Classification Search
CPC ..... H04W 12/00506; H04W 12/00409; H04W 63/1433; H04W 63/145; H04W 4/70; H04W 4/40; H04W 12/66; H04W 12/48; G06F 21/55; H04L 63/1433; H04L 63/145
See application file for complete search history.

(56) References Cited

U.S. PATENT DOCUMENTS

| 7,587,467 | B2 | 9/2009 | Hesselink et al. |
|---|---|---|---|
| 9,436,820 | B1* | 9/2016 | Gleichauf ............... G06F 21/50 |
| 9,614,815 | B2 | 4/2017 | Grange et al. |
| 9,756,047 | B1* | 9/2017 | Batchu .................. G06F 21/577 |
| 9,928,360 | B2* | 3/2018 | Von Bokern .......... H04L 63/102 |
| 10,178,132 | B2* | 1/2019 | Chahal .................. H04W 12/37 |
| 10,602,360 | B2* | 3/2020 | Allouche .............. H04L 63/105 |
| 10,748,219 | B2* | 8/2020 | Pearce .................. G06Q 40/08 |
| 2008/0086773 | A1 | 4/2008 | Tuvell et al. |
| 2010/0087184 | A1* | 4/2010 | Stoev ...................... H04L 67/16 |
|  |  |  | 455/422.1 |

(Continued)

OTHER PUBLICATIONS

A. M. Vegni and V. Loscrí, "A Survey on Vehicular Social Networks," in IEEE Communications Surveys & Tutorials, vol. 17, No. 4, pp. 2397-2419, Fourthquarter 2015. (Year: 2015).*

(Continued)

*Primary Examiner* — Kari L Schmidt
(74) *Attorney, Agent, or Firm* — Fish & Richardson P.C.

(57) ABSTRACT

Systems, methods, and software can be used to improve the security for machine to machine communications. In some aspects, a method is disclosed comprising: receiving, at a vehicle, a connection request from an electronic device; receiving, at the vehicle, security posture information from the electronic device, wherein the security posture information comprises at least one of operating system update information or antivirus status information; and determining, by the vehicle, whether to connect to the electronic device based on the security posture information of the electronic device.

11 Claims, 2 Drawing Sheets

(56) References Cited

U.S. PATENT DOCUMENTS

| | | | | |
|---|---|---|---|---|
| 2014/0079217 | A1* | 3/2014 | Bai | H04L 63/0869 |
| | | | | 380/270 |
| 2014/0123292 | A1* | 5/2014 | Schmidt | H04L 67/10 |
| | | | | 726/25 |
| 2014/0173738 | A1* | 6/2014 | Condry | G06F 21/568 |
| | | | | 726/25 |
| 2014/0181893 | A1* | 6/2014 | Von Bokern | H04L 9/3234 |
| | | | | 726/1 |
| 2016/0164881 | A1* | 6/2016 | Bankowski | H04L 43/08 |
| | | | | 726/4 |
| 2016/0191567 | A1* | 6/2016 | Chahal | H04W 12/06 |
| | | | | 726/1 |
| 2017/0257345 | A1* | 9/2017 | Westra | H04W 12/08 |
| 2017/0324733 | A1* | 11/2017 | Howry | H04W 12/50 |
| 2018/0072190 | A1* | 3/2018 | Kowalski | B60N 2/0244 |
| 2018/0097775 | A1* | 4/2018 | Obaidi | H04W 4/80 |
| 2018/0295518 | A1* | 10/2018 | Alloche | H04L 9/3268 |
| 2019/0166630 | A1* | 5/2019 | Sivakumar | H04W 24/10 |

OTHER PUBLICATIONS

Le, Vu, Sumit Gulwani, and Zhendong Su. "Smartsynth: Synthesizing smartphone automation scripts from natural language." Proceeding of the 11th annual international conference on Mobile systems, applications, and services. 2013, pp. 193-206. (Year: 2013).*

M. Frustaci, P. Pace, G. Aloi and G. Fortino, "Evaluating Critical Security Issues of the IoT World: Present and Future Challenges," in IEEE Internet of Things Journal, vol. 5, No. 4, pp. 2483-2495, Aug. 2018. (Year: 2018).*

* cited by examiner

SECURE COMMUNICATION FOR MACHINE TO MACHINE CONNECTIONS

TECHNICAL FIELD

The present disclosure relates to improving the security for machine to machine communications.

BACKGROUND

Machine to machine (M2M) refers to direct communication between devices over a communications channel, e.g., a wired or a wireless communications channel. Examples of machine to machine communication can include communications between industrial instrumentation, e.g., between a sensor or meter and a controller, to communicate the data that the sensor or meter records (such as temperature or inventory level) to application software on the controller that processes the data, issues adjusting commands, or both.

In one example, machine to machine communication can be performed between a vehicle and an electronic device (e.g., a mobile phone) to exchange data. They can be performed by using short range communication technologies such as Bluetooth (BT), Near Field Communication (NFC), or wireless local area network (WLAN or WiFi).

DESCRIPTION OF DRAWINGS

Like reference numbers and designations in the various drawings indicate like elements.

DETAILED DESCRIPTION

In some cases, a vehicle can exchange data with an electronic device using short range communication technologies. For example, the electronic device can connect with the vehicle and send navigation information, traffic information, or other data that can be used by an autopilot processing platform of the vehicle to generate autopilot command. The electronic device can also execute a software application that controls one or more functions of the vehicle through the data connection with the vehicle. The electronic device can also be a peripheral device, e.g., a headset or a display, that receives data from the vehicle.

The various ways of data transfer between the vehicle and the electronic device can also pose security risks. For example, the electronic device may be infested with malware. Malware can take advantage of the data connection with the vehicle and introduce security risks. For example, malware may cause erroneous data to be transferred to the vehicle, and thus increase driving risks and reduce road safety.

Figure 1:
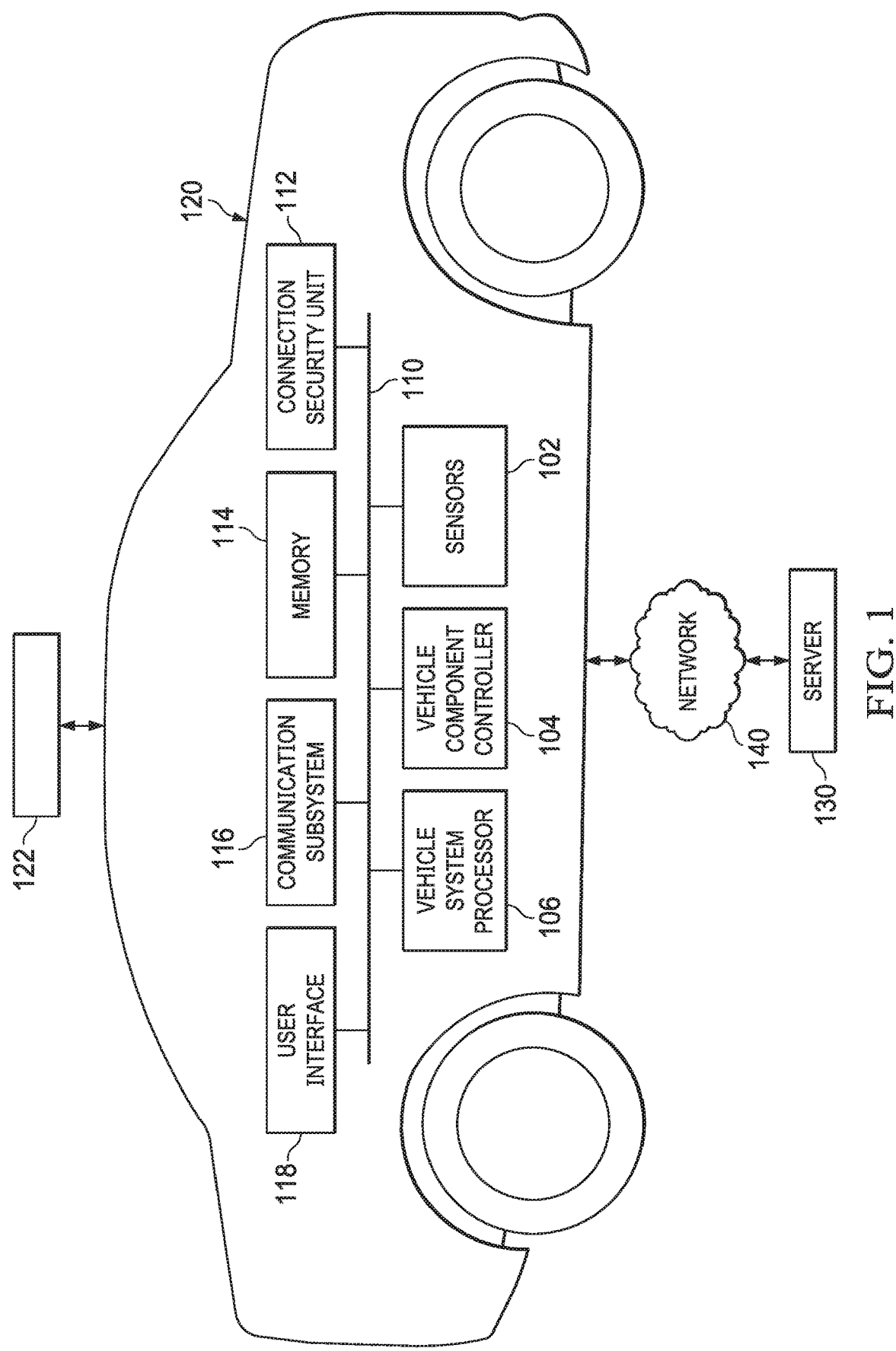
FIG. 1 is a schematic diagram showing an example communication system that improves the security for machine to machine communications, according to an implementation.
Figure 2:
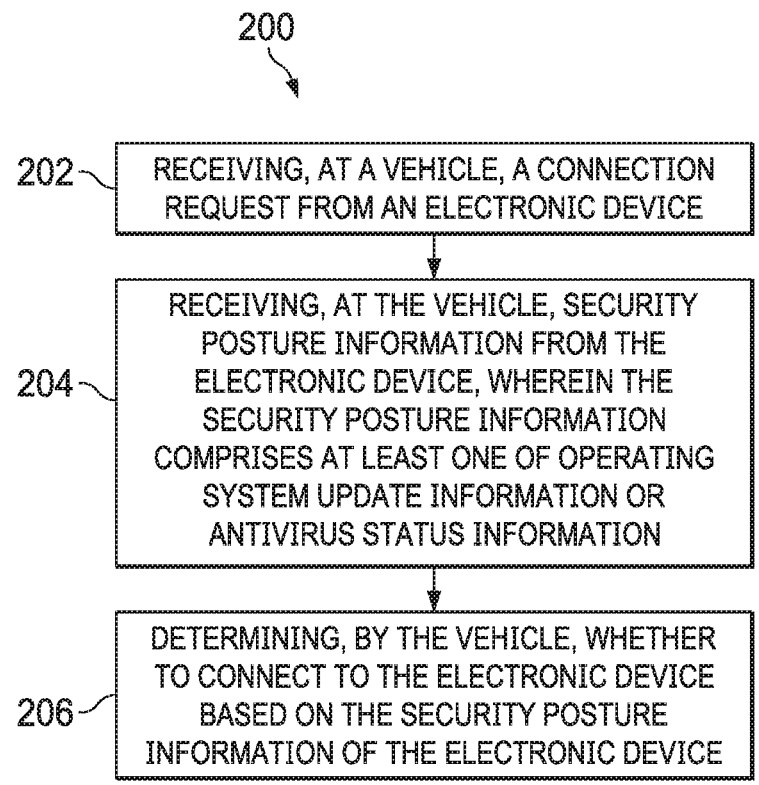
FIG. 2 is a flow diagram showing an example method that improves the security for machine to machine communications, according to an implementation.
Figure 3:
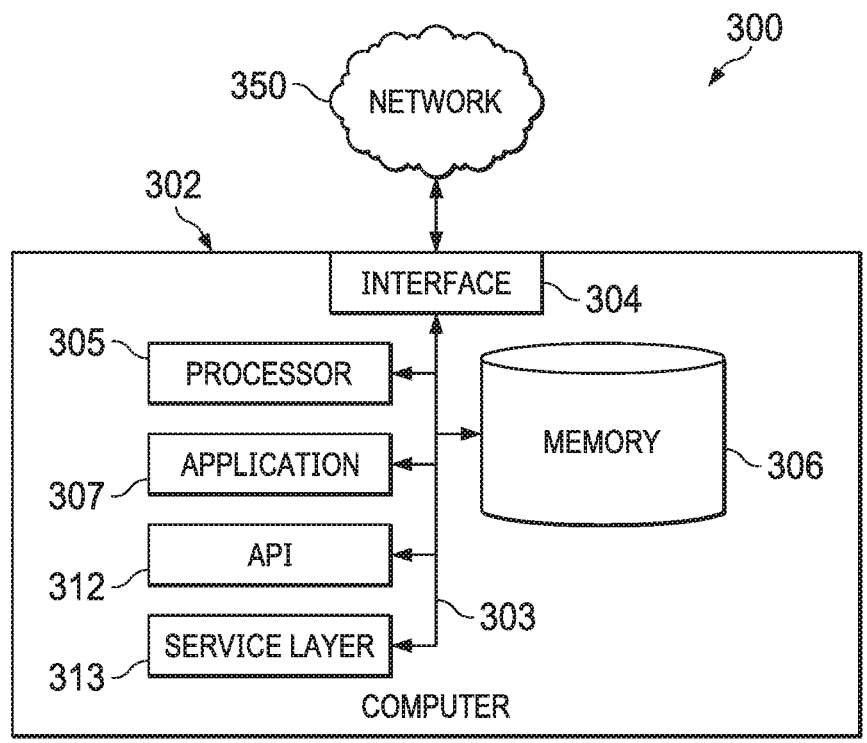
FIG. 3 is a high-level architecture block diagram of a computing system, according to an implementation.

In some implementations, security posture information can be exchanged between the vehicle and the electronic device. The security posture information can include operating system update information, antivirus status information, or both. This information can indicate the security status of the electronic device. An electronic device with an up-to-date antivirus scanning operation and an up-to-date system update is less likely to have malware that causes security risk. Accordingly, the vehicle can determine the security status of the electronic device based on the security posture information and control the data connection based on the security status. FIGS. 1-3 and associated descriptions provide additional details to these implementations. This approach improves the security of communication between the vehicle and the electronic device and improves traffic safety.

FIG. 1 is a schematic diagram showing an example communication system 100 that improves the security for machine to machine communications, according to an implementation. At a high level, the example communication system 100 includes a vehicle 120 that is communicatively coupled with an electronic device 122. The vehicle 120 is also communicatively coupled with a server 130 over a network 140.

The vehicle 120 can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. In the illustrated example, the vehicle 120 includes one or more sensors 102, a vehicle component controller 104, a vehicular system processor 106, a communication subsystem 116, a user interface 118, memory 114, and a connection security unit 112, that are connected to a bus 110.

In some cases, a vehicle can include one or more sensors. The one or more sensors can generate inputs, e.g., video or audio inputs, that reflect the surroundings of the vehicle. Examples of the sensors can include cameras, microphones, laser, radar, ultrasonic, light detection and ranging (LIDAR) or any other sensors.

The vehicle 120 includes one or more sensors 102 that detect or measure information for the vehicle 120. Examples of the sensors 102 can include devices that capture environmental information that is external to the vehicle 120, such as cameras, microphones, laser, radar, ultrasonic, light detection and ranging (LIDAR), and the like. These sensors can provide environmental inputs for an autopilot processing platform operating on the vehicle 120 to make autopilot decisions. Examples of the sensors 102 can also include devices that capture information that is internal to the vehicle 120, such as monitors for components such as engine, battery, fuel, electronic system, cooling systems, and the like. These sensors can provide operation status and warnings to the autopilot processing platform operating on the vehicle 120.

The vehicle 120 includes a vehicle component controller 104. Although illustrated as a vehicle component controller 104 in FIG. 1, the vehicle 120 can include two or more vehicle component controllers 104. The vehicle component controller 104 represents a controller that controls the operation of a component on the vehicle 120. Examples of the components can include engine, accelerator, brake, radiator, battery, steering wheel, transmission system, cooling system, electrical system, and any other components of the vehicle 120. The vehicle component controller 104 can operate a respective component automatically, according to input from the vehicular system processor 106, or a combination thereof. In some implementations, the vehicle component controller 104 can include a data processing apparatus.

The vehicular system processor 106 can include one or more processing components (alternatively referred to as "processors" or "central processing units" (CPUs)) configured to execute instructions related to one or more of the processes, steps, or actions for the autopilot processing platform operating on the vehicle 120. Generally, the vehicular system processor 106 executes instructions and manipulates data to perform the operations of the autopilot processing platform. The vehicular system processor 106 can receive inputs from the sensors 102 and generate commands to the vehicle component controller 104. In some cases, the vehicular system processor 106 can perform autopilot operations. In some cases, the vehicular system processor 106 can include a data processing apparatus.

The communication subsystem 116 can be configured to provide wireless or wireline communication for data or control information of the vehicle 120. For example, the communication subsystem 116 can support transmissions over wireless local area network (WLAN or WiFi), near field communication (NFC), infrared (IR), Radio-frequency identification (RFID), Bluetooth (BT), Universal Serial Bus (USB), or any other short-range communication protocols. The communication subsystem 116 can also support Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, 5G, or any other radio access technologies. The communication subsystem 116 can include, for example, one or more antennas, a receiver, a transmitter, a local oscillator, a mixer, and a digital signal processing (DSP) unit. In some implementations, the communication subsystem 116 can support multiple input multiple output (MIMO) transmissions. In some implementations, the receivers in the communication subsystem 116 can be an advanced receiver or a baseline receiver.

The user interface 118 can include, for example, any of the following: one or more of a display or touch screen display (for example, a liquid crystal display (LCD), a light emitting diode (LED), an organic light emitting diode (OLED), or a micro-electromechanical system (MEMS) display), a keyboard or keypad, a trackball, a speaker, or a microphone. The user interface 118 can also include I/O interface, for example, a universal serial bus (USB) interface.

The memory 114 can be a computer-readable storage medium. Examples of the memory 114 include volatile and non-volatile memory, magnetic media, optical media, random access memory (RAM), read-only memory (ROM), removable media, and others. The memory 114 can store an operating system (OS) of the vehicle 120 and various other computer-executable software programs for performing one or more of the processes, steps, or actions described above.

The connection security unit 112 represents an application, a set of applications, software, software modules, hardware, or any combination thereof that can be configured to determine whether the electronic device 122 meets the security level for data transfer. In some cases, the connection security unit 112 can receive security posture information from the electronic device 122, and determine whether the electronic device 122 meets a minimum security level to establish and maintain connection with the vehicle 120 for data transfer. FIG. 2 and associated descriptions provide additional details of these implementations. In some implementations, the connection security unit 112 can be implemented as a separate software program or part of a software program stored in the memory 114 and executed by the vehicular system processor 106.

As illustrated, the bus 110 provides a communication interface for components of the autopilot processing platform operating on the vehicle 120. In some cases, the bus 110 can be implemented using a Controller Area Network (CAN) bus.

The electronic device 122 represents an electronic device that connects with the vehicle 120 for data transfer. The electronic device 122 may include, without limitation, any of the following: endpoint, computing device, mobile device, mobile electronic device, user device, mobile station, subscriber station, portable electronic device, mobile communications device, wireless modem, wireless terminal, or other electronic device. Examples of an endpoint may include a mobile device, IoT (Internet of Things) device, EoT (Enterprise of Things) device, cellular phone, personal data assistant (PDA), smart phone, laptop, tablet, personal computer (PC), pager, portable computer, portable gaming device, wearable electronic device, health/medical/fitness device, camera, or other mobile communications devices having components for communicating voice or data via a wireless communication network. The electronic device 122 can also be a peripheral device, such as a headset, a remote controller, or a display.

The electronic device 122 can connect with the vehicle 120 using a short-range communication technology. The short-range communication technology can be wireless, such as BT, NFC, WLAN. The short-range communication technology can also be wired, such as USB.

The server 130 represents an application, a set of applications, software, software modules, hardware, or any combination thereof that can be configured to send security policies or security level determination information to the vehicle 120. The server 130 can send updates of the security policies or security level determination information to the vehicle 120 periodically, based on an event-triggering mechanism, or both. FIG. 2 and associated descriptions provide additional details of these implementations.

The example communication system 100 includes the network 140. The network 140 represents an application, set of applications, software, software modules, hardware, or combination thereof, that can be configured to transmit data between the server 130 and the vehicle 120 in the system 100. The network 140 includes a wireless network, a wireline network, or a combination thereof. For example, the network 140 can include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, 5G, or any other radio access technologies. In some instances, the core networks may be evolved packet cores (EPCs).

A RAN is part of a wireless telecommunication system which implements a radio access technology, such as UMTS, CDMA2000, 3GPP LTE, 3GPP LTE-A, and 5G. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

While elements of FIG. 1 are shown as including various component parts, portions, or modules that implement the various features and functionality, nevertheless, these elements may, instead, include a number of sub-modules, third-party services, components, libraries, and such, as appropriate. Furthermore, the features and functionality of various components can be combined into fewer components, as appropriate.

FIG. 2 is a flow diagram showing an example method 200 that improves the security for machine to machine communications, according to an implementation. The method 200 can be implemented by the entities shown in FIG. 1, including, for example, the vehicle 120. The method 200 shown in FIG. 2 can also be implemented using additional, fewer, or different entities. Furthermore, the method 200 shown in FIG. 2 can be implemented using additional, fewer, or different operations, which can be performed in the order shown or in a different order. In some instances, an operation or a group of operations can be iterated or repeated, for example, for a specified number of iterations or until a terminating condition is reached.

At 202, the vehicle receives a connection request from an electronic device. The electronic device can be the electronic device 122 shown in FIG. 1. The connection request is transmitted using short range communication technologies, e.g., Bluetooth, NFC, or WLAN.

At 204, the vehicle receives security posture information from the electronic device. In some cases, the security posture information can be sent in response to a query from the vehicle. For example, in response to receiving the connection request, the vehicle sends a query for the security posture information. Alternatively, the electronic device can send the security posture information in response to sending the connection request, without waiting for the query. In some cases, the electronic device can send the security posture information with the connection request, in the same message. Alternatively, the electronic device can send the security posture information and the connection request in different messages.

The security posture information includes information indicating the security status of the electronic device. The information can include information related to the operating system of the electronic device, status of the antivirus operation performed on the electronic device, or both.

Information related to the operating system of the electronic device can include the type of operating system, e.g., ANDROID, IOS, MICROSOFT WINDOWS, LINUX, UNIX, or etc., the version of the operating system, the information for the most recent update (or patch) of the operating system, including for example the date or the number, and any combinations thereof. In some cases, information related to the operating system can also include information (type, version, update, etc.) related to low level system software, e.g., device driver or other firmware, of the electronic device.

Information related to the antivirus operation of the electronic device can include the information of the antivirus software that executes on the electronic device, e.g., the name and the version of the antivirus software, the information of the most recent time that the antivirus operation has been performed on the electronic device, e.g., the time and date of the last antivirus scan, the information of the antivirus database that was used during the last antivirus operation, e.g., the name, the version, or the last updating date of the antivirus signature database used by the last antivirus scan, the result of the most recent antivirus operation, e.g., the name of the virus found, isolated, or deleted during the last antivirus scan, or any combinations thereof. In some cases, more than one antivirus software can be installed and executed on the electronic device, or more than one antivirus database can be used in an antivirus scan operation on the electronic device. In these or other cases, the information related to the antivirus operation can include information of each antivirus software that performs antivirus operation on the electronic device, each antivirus database used in the antivirus operation, or a combination thereof.

The security posture information can be formatted using Extensible Markup Language (XML), JavaScript Object Notation (JSON), or other encoding format. Following is an example information block of the security posture information:

```
<OSUpdate>28/06/18 12:50pm</OSUpdate>
<AntiVirusScan>27/06/2018 13:00</AntiVirusScan>
<AntiVirusSignatureDatabase>28/06/2018
12:00</AntiVirusSignatureDatabase>
<<AntiVirusResult>kbRoy.A</AntiVirusResult
```

At 206, the vehicle determines whether to connect to the electronic device based on the security posture information. Based on the security posture information, the vehicle can determine whether the electronic device meets the security standard for communication. If the electronic device meets the security standard, the vehicle can proceed to communicate with the electronic device for data transfer. If the electronic device does not meet the security standard, the vehicle can reject further communication with the electronic device.

In one implementation example, the vehicle can determine a security confidence score of the electronic device based on the security posture information. The security confidence score can be determined based on one or more factors that indicate the security level for different aspects of the security status of the electronic device. The one or more factors can include one or more operating system factors and one or more antivirus operation factors. The operating system factors can include individual security factors based on the type, version, or update information of the operating system. In a variant, the vehicle can obtain a list of vulnerabilities from a database based on the type, version, or update information of the operating system. In one embodiment, each vulnerability is associated with a score, e.g., score that is determined based on the Common Vulnerability Scoring System (CVSS) framework. Hence, the vehicle can determine the security confidence score of the electronic device based on a combination of these information. The antivirus operation factors can include individual security factors based on the information of the antivirus software, time and result of the last antivirus scan operation, or the antivirus database. In one example, a higher number can be assigned to the antivirus database factor, indicating a higher secure level, if the antivirus database used by the antivirus software has a more recent update date. In contrast, if the antivirus database is outdated, a lower number can be assigned to the antivirus database factor. In some implementations, a conversion algorithm (e.g., a look-up table or a formula) can be configured at the vehicle. The vehicle can determine the individual security factors based on the conversion algorithm. The vehicle can further determine the security confidence score based on the operating system factors, antivirus operation factors, any individual security factors, or any combinations thereof. For example, the security confidence score can be calculated based on an average, a weighted average, a maximum, a minimum, a median, or any statistics metrics of these factors.

In some cases, a security policy can be configured at the vehicle. The security policy can indicate a minimum security level of the electronic device above which communication with the electronic device is authorized. In one implementation example, the security policy can include a security confidence threshold value, if the security confidence score meets or exceeds the security confidence threshold value, the communication is authorized. If the security confidence score is below the security confidence threshold value, the communication is rejected. Alternatively or in combination, the security policy can include a minimum requirement for one of the security factors discussed previously. The vehicle can determine that the electronic device is not secure and thus communication is not authorized if at least one of the security factors of the electronic device fails to meet the minimum requirement. For example, the security policy can include an update time for the antivirus database. If the antivirus database used by the electronic device in the most recent scan has an update time that is before the update time in the security policy, the vehicle can determine that the electronic device does not meet the minimum security level, and thus communication is not authorized.

In some implementations, the security policy can include more than one security level, each of the security level can correspond to one or more types of communications that are authorized. The types of communications can include the types of data transferred between the vehicle and the electronic device, the types of software application that initiates and manages the data transfer, the direction of data transfer, or any combinations thereof. In one example, the vehicle can determine, based on the security posture information of the electronic device, that the electronic device meets a first security level, but not a second security level (e.g., requiring a more recent update time of the antivirus database than the first security level). Accordingly, the vehicle can authorize audio data transfer (e.g., voice or music) but not file transfer, authorize a one-way data transfer from the vehicle to the electronic device but not from the electronic device to the vehicle, authorize data transfer for voice call but not for other application software executed on the electronic device, or any combinations thereof, authorize data transfer for non-driving functions, e.g., infotainment, but not for data that impacts driving functions, e.g., navigation data, traffic data, or other input data for generating autopilot commands.

In some cases, if the vehicle determines that the electronic device does not meet a security level, the vehicle can send a response to the electronic device to indicate a reason for which the security level is not met. For example, the vehicle can indicate that a particular factor, e.g., the last update time of the antivirus database, fails to meet a corresponding security policy. In some cases, the vehicle can further indicate the minimum requirement corresponding to the particular factor in the response.

In some cases, the security policy, the security factor conversion algorithms, or both can be configured at the vehicle. Alternatively, the security policy the security factor conversion algorithms, or both can be sent to the vehicle from a security server. The security server can update this information periodically, or based on a trigger event. This approach can enable the vehicle to keep track of the latest information of software security.

Steps 204 and 206 can be performed at various stages of the connection establishment between the vehicle and the electronic device. For example, these steps can be performed during the connection establishment. These steps can be included in the short-range communication protocols, e.g., Bluetooth or WLAN, that establish a connection between the vehicle and the electronic device. In one example, these steps can be performed as part of a Bluetooth pairing procedure. After the vehicle receives a pairing request from the electronic device, the vehicle can send a query for security posture information to the electronic device. The electronic device can send the security posture information in response. If the vehicle determines that the electronic device meets the minimum security level, the vehicle can send a response to indicate that the pairing is successful. If the vehicle determines that the electronic device does not meet the minimum security level, the vehicle can send a response to indicate that the pairing has failed, or the vehicle can refrain from sending the response that indicates a successful pairing and wait for the pairing procedure to fail due to time-out.

Alternatively or additionally, these steps can be performed after the initial connection is established between the vehicle and the electronic device. For example, these steps can be performed after an authentication procedure has been completed between the vehicle and the electronic device. The vehicle and the electronic device can use the secured communication channels established after the authentication procedure, e.g., encrypted channel, to exchange security posture information. In these or other cases, if the vehicle determines that the electronic device meets the minimum security level, the vehicle can maintain the connection with the electronic device. If the vehicle determines that the electronic device does not meet the minimum security level, the vehicle can initiate a connection release procedure to drop the connection with the electronic device.

In some implementations, the electronic device can include a Roots of Trust (RoT) module. The RoT module includes a set of functions that are executed in a trusted operating environment of the electronic device. The RoT can serve as a separate engine that controls the trusted computing platform cryptographic processor on the electronic device. Examples of functions performed by RoT can include: on the fly drive encryption, detection and reporting of unauthorized changes to the operating system or programs, detection of rootkits, memory curtaining to prevent programs from inappropriately reading from, or writing to, another program's memory, hardware-based digital rights management (DRM) support. In some cases, the electronic device can use the RoT to collect the security posture information, encapsulate the security posture information in an information block, send the security posture information to the vehicle, or any combinations thereof. In some cases, the vehicle can indicate, in a request for the security posture information, that the electronic device uses the RoT to perform the functions of collecting the security posture information, encapsulating the security posture information in an information block, sending the security posture information to the vehicle, or any combinations thereof. Using RoT to perform these functions reduces the risk of malware misreporting the information.

While the method of improving security for machine to machine communications is described from the prospective of the vehicle, similar approaches can be used from the perspective of the electronic device. For example, the electronic device can receive the security posture information discussed previously from the vehicle, and determine whether to establish or maintain the connection with the vehicle based on a security policy configured at the electronic device. Furthermore, while the method of improving security for machine to machine communications is described using the example of communications between a vehicle and an electronic device, the approaches described in this disclosure can also be applied to the machine to machine communications of other devices. For example, in a communication between a sensor and a controller, security posture information can be exchanged to determine whether the sensor, the controller, or both meet a minimum security level for data transfer.

FIG. 3 is a high-level architecture block diagram showing a computer 302 coupled with a network 350, according to an implementation. The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The network 350 facilitates communications between the computer 302 and other devices. In some cases, a user, e.g., an administrator, can access the computer 302 from a remote network. In these or other cases, the network 350 can be a wireless or a wireline network. In some cases, a user can access the computer 302 locally. In these or other cases, the network 350 can also be a memory pipe, a hardware connection, or any internal or external communication paths between the components.

The computer 302 includes a computing system configured to perform the algorithm described in this disclosure. For example, the computer 302 can be used to implement the server 130 shown in FIG. 1. The computer 302 can be used to implement the electronic device 122 shown in FIG. 1, e.g., as a laptop computer or a smart phone. In some cases, the algorithm can be implemented in an executable computing code, e.g., C/C++ executable code. Alternatively, or in combination, the algorithm can be implemented in an application program, e.g., EXCEL. In some cases, the computer 302 can include a standalone LINUX system that runs batch applications. In some cases, the computer 302 can include mobile or personal computers that run the application program.

The computer 302 may include an input device, such as a keypad, keyboard, touch screen, microphone, speech recognition device, or another device that can accept user information, and/or an output device that conveys information associated with the operation of the computer 302, including digital data, visual and/or audio information, or a GUI.

The computer 302 can serve as a client, network component, a server, a database or other persistency, or the like. In some implementations, one or more components of the computer 302 may be configured to operate within a cloud-computing-based environment.

At a high level, the computer 302 is an electronic computing device operable to receive, transmit, process, store, or manage data and information. According to some implementations, the computer 302 may also include or be communicably coupled with an application server, e-mail server, web server, caching server, streaming data server, business intelligence (BI) server, and/or other server.

The computer 302 can receive requests over network 350 from a client application (e.g., executing on a user device) and respond to the received requests by processing said requests in an appropriate software application. In addition, requests may also be sent to the computer 302 from internal users (e.g., from a command console or by another appropriate access method), external or third parties, other automated applications, as well as any other appropriate entities, individuals, systems, or computers.

Each of the components of the computer 302 can communicate using a system bus 303. In some implementations, any and/or all the components of the computer 302, both hardware and/or software, may interface with each other and/or the interface 304 over the system bus 303, using an application programming interface (API) 312 and/or a service layer 313. The API 312 may include specifications for routines, data structures, and object classes. The API 312 may be either computer language-independent or -dependent and refer to a complete interface, a single function, or even a set of APIs. The service layer 313 provides software services to the computer 302. The functionality of the computer 302 may be accessible for all service consumers using this service layer. Software services, such as those provided by the service layer 313, provide reusable, defined business functionalities through a defined interface. For example, the interface may be software written in JAVA, C++, or other suitable language providing data in Extensible Markup Language (XML) format or other suitable format. While illustrated as an integrated component of the computer 302, alternative implementations may illustrate the API 312 and/or the service layer 313 as stand-alone components in relation to other components of the computer 302. Moreover, any or all parts of the API 312 and/or the service layer 313 may be implemented as child or sub-modules of another software module or hardware module, without departing from the scope of this disclosure.

The computer 302 includes an interface 304. Although illustrated as a single interface 304 in FIG. 3, two or more interfaces 304 may be used according to particular needs, configurations, or particular implementations of the computer 302. The interface 304 is used by the computer 302 for communicating with other systems in a distributed environment connected to the network 350—(whether illustrated or not). Generally, the interface 304 comprises logic encoded in software and/or hardware in a suitable combination and operable to communicate with the network 350. More specifically, the interface 304 may comprise software supporting one or more communication protocols associated with communications such that the network 350 or interface's hardware are operable to communicate physical signals.

The computer 302 includes a processor 305. Although illustrated as a single processor 305 in FIG. 3, two or more processors may be used according to particular needs, configurations, or particular implementations of the computer 302. Generally, the processor 305 executes instructions and manipulates data to perform the operations of the computer 302. In some cases, the processor 305 can include a data processing apparatus.

The computer 302 also includes a memory 306 that holds data for the computer 302. Although illustrated as a single memory 306 in FIG. 3, two or more memories may be used according to particular needs, configurations, or particular implementations of the computer 302. While memory 306 is illustrated as an integral component of the computer 302, in alternative implementations, memory 306 can be external to the computer 302.

The application 307 comprises an algorithmic software engine providing functionality according to particular needs, configurations, or particular implementations of the computer 302. Although illustrated as a single application 307, the application 307 may be implemented as multiple applications 307 on the computer 302. In addition, although illustrated as integral to the computer 302, in alternative implementations, the application 307 can be external to the computer 302.

There may be any number of computers 302 associated with, or external to, the system 300 and communicating over network 350. Further, the terms "client," "user," and other appropriate terminology may be used interchangeably, as appropriate, without departing from the scope of this disclosure. Moreover, this disclosure contemplates that many users may use one computer 302, or that one user may use multiple computers 302.

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively, or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or any combinations of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable, conventional operating system.

A computer program, which may also be referred to, or described, as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site, or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include by way of example a programmable processor, a computer, a system on a chip, or multiple ones, or combinations of the foregoing. A processor can include special purpose logic circuitry, e.g., an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random-access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, either hardware or software (or a combination of hardware and software), may interface with each other, or the interface using an application programming interface (API), or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can, generally, be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

The invention claimed is:

1. A method, comprising:
   receiving, at a vehicle, a connection request from an electronic device, wherein the connection request is a Bluetooth pairing request; and
   in response to receiving the Bluetooth pairing request, initiating, by the vehicle, a Bluetooth pairing operation, wherein the Bluetooth pairing operation comprises:
      sending, by the vehicle and to the electronic device, a first Bluetooth message that comprises a query for security posture information;
      in response to the query, receiving, at the vehicle, a second Bluetooth message that comprises security posture information from the electronic device, wherein the security posture information comprises at least one of operating system update information or antivirus status information;
      determining, at the vehicle, a security confidence score of the electronic device based on the security posture information of the electronic device;
      determining, by the vehicle, whether to connect to the electronic device based on the security confidence score of the electronic device; and
      in response to determining to connect to the electronic device based on the security posture information of the electronic device, sending, by the vehicle, a third Bluetooth message indicating a successful Bluetooth pairing.

2. The method of claim 1, further comprising:
   authenticating, by the vehicle, the electronic device; and wherein
   whether to connect to the electronic device is determined by the vehicle after a successful authentication of the electronic device.

3. The method of claim 1, wherein the security posture information comprises the antivirus status information, and the antivirus status information comprises at least one of information of a time of an antivirus operation performed on the electronic device, a result of the antivirus operation performed on the electronic device, or an update time of an antivirus database used by the antivirus operation.

4. The method of claim 1, wherein whether to connect to the electronic device is further determined based on a security policy configured at the vehicle.

5. A vehicle, comprising:
   at least one hardware processor; and
   a computer-readable storage medium coupled to the at least one hardware processor and storing programming instructions for execution by the at least one hardware processor, wherein the programming instructions, when executed, cause the at least one hardware processor to perform operations comprising:
   receiving, at the vehicle, a connection request from an electronic device, wherein the connection request is a Bluetooth pairing request; and
   in response to receiving the Bluetooth pairing request, initiating, by the vehicle, a Bluetooth pairing operation, wherein the Bluetooth pairing operation comprises:
      sending, by the vehicle and to the electronic device, a first Bluetooth message that comprises a query for security posture information;
      in response to the query, receiving, at the vehicle, a second Bluetooth message that comprises security posture information from the electronic device, wherein the security posture information comprises at least one of operating system update information or antivirus status information;
      determining, at the vehicle, a security confidence score of the electronic device based on the security posture information of the electronic device;
      determining, by the vehicle, whether to connect to the electronic device based on the security confidence score of the electronic device; and
      in response to determining to connect to the electronic device based on the security posture information of the electronic device, sending, by the vehicle, a third Bluetooth message indicating a successful Bluetooth pairing.

6. The vehicle of claim 5, the operations further comprising:
   authenticating, by the vehicle, the electronic device; and wherein
   whether to connect to the electronic device is determined by the vehicle after a successful authentication of the electronic device.

7. The vehicle of claim 5, wherein the security posture information comprises the antivirus status information, and the antivirus status information comprises at least one of information of a time of an antivirus operation performed on the electronic device, a result of the antivirus operation performed on the electronic device, or an update time of an antivirus database used by the antivirus operation.

8. The vehicle of claim 5, wherein whether to connect to the electronic device is further determined based on a security policy configured at the vehicle.

9. A non-transitory computer-readable medium storing instructions which, when executed, cause a computing device to perform operations comprising:
   receiving, at a vehicle, a connection request from an electronic device, wherein the connection request is a Bluetooth pairing request; and
   in response to receiving the Bluetooth pairing request, initiating, by the vehicle, a Bluetooth pairing operation, wherein the Bluetooth pairing operation comprises:
      sending, by the vehicle and to the electronic device, a first Bluetooth message that comprises a query for security posture information;
      in response to the query, receiving, at the vehicle, a second Bluetooth message that comprises security posture information from the electronic device, wherein the security posture information comprises at least one of operating system update information or antivirus status information;

determining, at the vehicle, a security confidence score of the electronic device based on the security posture information of the electronic device;

determining, by the vehicle, whether to connect to the electronic device based on the security confidence score of the electronic device; and in response to determining to connect to the electronic device based on the security posture information of the electronic device, sending, by the vehicle, a third Bluetooth message indicating a successful Bluetooth pairing.

10. The computer-readable medium of claim 9, the operations further comprising:

authenticating, by the vehicle, the electronic device; and wherein whether to connect to the electronic device is determined by the vehicle after a successful authentication of the electronic device.

11. The computer-readable medium of claim 9, wherein the security posture information comprises the antivirus status information, and the antivirus status information comprises at least one of information of a time of an antivirus operation performed on the electronic device, a result of the antivirus operation performed on the electronic device, or an update time of an antivirus database used by the antivirus operation.

* * * * *